US011502590B2

(12) United States Patent
Izumi et al.

(10) Patent No.: US 11,502,590 B2
(45) Date of Patent: Nov. 15, 2022

(54) RADIAL-GAP TYPE SUPERCONDUCTING SYNCHRONOUS MACHINE, MAGNETIZING APPARATUS, AND MAGNETIZING METHOD

(71) Applicant: National University Corporation Tokyo University of Marine Science and Technology, Tokyo (JP)

(72) Inventors: Mitsuru Izumi, Tokyo (JP); Motohiro Miki, Tokyo (JP)

(73) Assignee: National University Corporation Tokyo University Of Marine Science And Technology, Tokyo (JP)

( * ) Notice: Subject to any disclaimer, the term of this patent is extended or adjusted under 35 U.S.C. 154(b) by 277 days.

(21) Appl. No.: 16/786,673

(22) Filed: Feb. 10, 2020

(65) Prior Publication Data
US 2020/0251971 A1 Aug. 6, 2020

Related U.S. Application Data

(62) Division of application No. 15/300,220, filed as application No. PCT/JP2015/059155 on Mar. 25, 2015, now Pat. No. 10,594,197.

(30) Foreign Application Priority Data
Mar. 28, 2014 (JP) .................. 2014-069925

(51) Int. Cl.
*H02K 55/00* (2006.01)
*H02K 21/14* (2006.01)
(Continued)

(52) U.S. Cl.
CPC .............. *H02K 21/14* (2013.01); *H01F 6/00* (2013.01); *H01F 13/003* (2013.01); *H02K 1/02* (2013.01);
(Continued)

(58) Field of Classification Search
CPC ...................... H02K 1/02; H02K 55/00–55/06
See application file for complete search history.

(56) References Cited

U.S. PATENT DOCUMENTS 3,673,444 A 6/1972 Kawabe et al.
5,177,054 A 1/1993 Lloyd et al.
(Continued)

FOREIGN PATENT DOCUMENTS

AU 2012289033 A1 2/2014
CN 102422514 A * 4/2012 .............. F17C 13/00
(Continued)

OTHER PUBLICATIONS

International Search Report and Written, International Application No. PCT/JP2015/059155 (published under WO 2015/147068), 14 pages (dated Jun. 30, 2015).
(Continued)

*Primary Examiner* — Ramon M Barrera
(74) *Attorney, Agent, or Firm* — Perkins Coie LLP

(57) ABSTRACT

A radial-gap type superconducting synchronous machine 1 is prepared which includes a rotor 20 having, on its peripheral side, a convex magnetic pole 21 which includes, at its distal end part, bulk superconductors 30. When viewed in the direction of the rotational axis C1 of the rotor 20, the magnetic pole center side of the bulk superconductors 30 is disposed nearer to a stator 10 than the magnetic pole end side of the bulk superconductors 30. A ferromagnet 28 is disposed on the rotational axis C1 side of the bulk superconductors 30. A magnetizing apparatus 100 is disposed outside the bulk superconductors 30 in the radial direction of the rotor 20. Magnetization of the bulk superconductors 30 is performed by directing magnetic flux lines from the magnetizing apparatus 100 toward the bulk superconductors 30.

4 Claims, 12 Drawing Sheets

(51) Int. Cl.
   *H02K 15/03*    (2006.01)
   *H02K 55/04*    (2006.01)
   *H02K 1/02*     (2006.01)
   *H02K 1/2793*   (2022.01)
   *H01F 6/00*     (2006.01)
   *H01F 13/00*    (2006.01)

(52) U.S. Cl.
   CPC ............ *H02K 1/2793* (2013.01); *H02K 15/03* (2013.01); *H02K 55/04* (2013.01); *Y02E 40/60* (2013.01)

(56) References Cited

U.S. PATENT DOCUMENTS

| | | | |
|---|---|---|---|
| 6,111,490 | A | 8/2000 | Yanagi et al. |
| 7,453,174 | B1 | 11/2008 | Kalsi |
| 7,750,524 | B2 | 7/2010 | Sugimoto et al. |
| 2002/0067092 | A1 | 6/2002 | Crapo et al. |
| 2005/0082935 | A1* | 4/2005 | Frank ............... H02K 55/04 310/52 |
| 2015/0229168 | A1 | 8/2015 | Murase et al. |

FOREIGN PATENT DOCUMENTS

| | | |
|---|---|---|
| EP | 0 392 028 A1 | 10/1990 |
| JP | 05-219717 a | 8/1993 |
| JP | 2003-332128 a | 11/2003 |
| JP | 2004-235625 B2 | 8/2004 |
| JP | 2008-034692 A | 2/2008 |
| JP | 2012-143050 A | 7/2012 |

OTHER PUBLICATIONS

Supplementary European Search Report, European Application No. 15 76 9533.9 (published under EP 3 125 415), 9 pages (dated Dec. 5, 2017).

Office Action, Japanese Patent Application No. 2016-510432, 4 pages, dated Dec. 11, 2018, with English translation, (5 pages).

Machine Translation, NITTA, JP-2003332128-A (Nov. 2003).

Feng et al., "Radial Flux High Temperature Superconductor Motor Using Bulk-Trapped Field Magnets," Electric Machines and Drives Conference, 2009, IEEE International, Piscataway, New Jersey, pp. 458-464 (May 3, 2009).

Zhou et al., "An overview of rotating machine systems with high-temperature bulk superconductors," Superconductor Science and Technology, vol. 25, 12 pages (2012).

* cited by examiner

| | TYPE | ROTATIONAL SPEED (rpm) | TORQUE (Nm) | POWER OUTPUT (kW) | SUPERCON-DUCTING MATERIAL | REFRIGE-RANT OR COOLING METHOD | CAPTURED MAGNETIC FLUX DENSITY (T) |
|---|---|---|---|---|---|---|---|
| EXAMPLE | RADIAL-GAP TYPE SUPERCONDUCTING SYNCHRONOUS MACHINE | 190 | 1508 | 30 | GdBCO | NEON | 5 |
| COMP. EXAMPLE 1 | RELUCTANCE-TYPE SUPERCONDUCTING SYNCHRONOUS MACHINE (RADIAL GAP) | 3000 | 127 | 40 | YBCO | LIQUID NITROGEN | — |
| COMP EXAMPLE 2 | RADIAL-GAP TYPE SUPERCONDUCTING SYNCHRONOUS MACHINE | 600 | 24 | 15 | YBCO | DIRECT CONDUC-TION COOLING | — |
| COMP EXAMPLE 3 | AXIAL-GAP TYPE SUPERCONDUCTING SYNCHRONOUS MACHINE | 720 | 212 | 16 | GdBCO | LIQUID NITROGEN | 0.8–0.9 |

FIG.13

RADIAL-GAP TYPE SUPERCONDUCTING SYNCHRONOUS MACHINE, MAGNETIZING APPARATUS, AND MAGNETIZING METHOD

CROSS-REFERENCE TO RELATED APPLICATIONS

This application is a division of U.S. application Ser. No. 15/300,220 filed Jul. 14, 2017, which is a 371 application of PCT/JP2015/059155 filed Mar. 25, 2015, which claims priority to Japanese Patent Application No. 2014-069925 filed Mar. 28, 2014, the contents of each of which applications is hereby incorporated by reference in its entirety.

TECHNICAL FIELD

The present invention relates to a radial-gap type superconducting synchronous machine, a magnetizing apparatus and a magnetizing method, and more particularly to a technique for effectively increasing captured magnetic flux in an object to be magnetized while ensuring the practical utility.

BACKGROUND ART

Superconducting synchronous machines, which use a superconducting material for a field system or an armature, have attracted attention e.g. for the reason that a high power output can be obtained with high efficiency, and studies and proposals have been made thereon. As with common synchronous machines not using a superconducting material, superconducting synchronous machine can be classified broadly into a radial-gap type and an axial-gap type. Patent document 1 (Japanese Patent No. 5162654), for example, discloses a superconducting synchronous machine of the radial-gap type (hereinafter referred to as a radial-gap type superconducting synchronous machine), and patent document 2 (Japanese Patent Laid-Open Publication No. 2004-235625) by the present inventors, for example, discloses a superconducting synchronous machine of the axial-gap type (hereinafter referred to as an axial-gap type superconducting synchronous machine).

The radial-gap type superconducting synchronous machine of patent document 1 is a rotating field system-type synchronous machine in which a field system portion of a rotor is comprised of a permanent magnet, and an armature coil, provided in an armature as a stator, is comprised of a superconducting coil made of a superconducting material.

In the radial-gap type superconducting synchronous machine, a higher electric current can flow in the superconducting coil as compared to a copper coil, or the like, used in a common synchronous machine. Therefore, a large magnetic field can be generated by allowing the superconducting coil to function as an electromagnet. This makes it possible to produce a high power output with high efficiency.

On the other hand, the axial-gap type superconducting synchronous machine of patent document 2 has rotors and stators arranged alternately in the rotational axis direction of the rotors (a stator, a rotor and a stator are arranged in this order in an illustrated embodiment). The field system portion of the rotor is composed of a bulk superconductor.

A bulk superconductor, which is a mass of superconductor crystals, can capture magnetic flux lines at pinning points therein when a magnetic field (magnetic flux) is introduced into the bulk superconductor at a temperature which is not more than a critical temperature at which the matrix superconductor shows a superconducting transition. This enables the bulk superconductor to act as a magnet having a higher magnetic flux density than a permanent magnet. Thus, according to the synchronous machine, a field system portion having a high magnetic flux density can be obtained by allowing the bulk superconductor to capture magnetic flux lines, whereby a high power output can be obtained with high efficiency. Further, the bulk superconductor can hold a stronger magnetic field than a superconducting coil provided that the superconducting coil has the same size as the bulk superconductor. The synchronous machine therefore has an advantage in terms of downsizing over a synchronous machine which uses a superconducting coil. Furthermore, the synchronous machine does not require connecting wiring for supplying electric current to the field system portion. The synchronous machine therefore has advantages also in terms of simplification of the device structure and enhancement in the efficiency of the device system, such as reduction in the amount of incoming heat.

The axial-gap type superconducting synchronous machine of patent document 2 also has an advantage in that an armature coil, provided in an armature as a stator, is configured to function also as a magnetizing coil (magnetizing apparatus) for the bulk superconductor. Thus, the magnetizing apparatus is integrated with the synchronous machine. This makes it possible to magnetize the bulk superconductor conveniently in a timely manner.

The axial-gap type superconducting synchronous machine of patent document 2, in performing its magnetization with the armature coil, uses pulse magnetization in order to prevent the magnetizing apparatus from becoming large-sized upon the integration of the magnetizing apparatus with the synchronous machine and thereby losing the practical utility. A superconductor may be magnetized by pulse magnetization or static magnetic field magnetization. In the case of pulse magnetization, a strong magnetic field is instantaneously applied to a bulk superconductor, which is held at a temperature lower than its superconducting critical temperature, to introduce magnetic flux into the bulk superconductor. The bulk superconductor is allowed to capture the magnetic flux by the pinning effect, so that the bulk superconductor will function as a magnet having a high magnetic flux density. In the case of static magnetic field magnetization, a static magnetic field (stationary magnetic field) is applied to a bulk superconductor, which is held at a temperature higher than its superconducting critical temperature, to introduce magnetic flux into the bulk superconductor. The temperature of the bulk superconductor is then lowered to a temperature lower than the superconducting critical temperature, and the bulk superconductor is held at that temperature to allow the bulk superconductor to capture the magnetic flux by the pinning effect, thereby allowing the bulk superconductor to function as a magnet having a high magnetic flux density. In general, an object to be magnetized, such as a bulk superconductor, can capture more magnetic flux lines by static magnetic field magnetization than by pulse magnetization. However, in order to generate a necessary high static magnetic field in static magnetic field magnetization, it is necessary to produce a coil commensurate with the size of an object to be magnetized, and to cause a high electric current to flow in the coil. Further, magnetization of the object is performed by applying the static magnetic field to the object for a long time. The use of static magnetic field magnetization thus requires a large-scale magnetizing apparatus using a superconducting coil. For these reasons, the axial-gap type superconducting synchronous machine of patent document 2 uses pulse magnetization to magnetize the bulk superconductor with the armature coil. The practical utility can be ensured by the downsizing and integration of the magnetizing coil.

PRIOR ART DOCUMENTS

Patent Documents

Patent document 1: Japanese Patent No. 5162654
Patent document 2: Japanese Patent Laid-Open Publication No. 2004-235625

SUMMARY OF THE INVENTION

Problems to be Solved by the Invention

A demand exists these days for the practical use of a high-power (ultrahigh-power) superconducting synchronous machine which can be suitably applied in a ship propulsion system, a generator that uses renewable energy, etc. In this regard, to increase the magnetic flux density of a field system portion is a conceivable approach. However, in the case of the axial-gap type superconducting synchronous machine of patent document 2 which uses the bulk superconductor that can capture a high magnetic flux density, but on the other hand uses pulse magnetization, there is a limit to a magnetic flux density that can be captured by the bulk superconductor. If an attempt is made to employ static magnetic field magnetization in the synchronous machine, a large-scale magnetizing apparatus using a superconducting coil will be needed as described above. Since the size of the entire synchronous machine should thus be increased, this attempt is not always desirable in the light of practical utility. In particular, in static magnetic field magnetization, a coil is generally disposed such that it surrounds the periphery of an object to be magnetized. If in the synchronous machine of patent document 2 a coil is disposed such that it surrounds the bulk superconductor provided in the rotor, the rotor will increase in size excessively and wiring will become complicated, whereby the practical utility will be lost.

From such viewpoints, the present inventors have made intensive studies on a technique which uses static magnetic field magnetization and yet ensures practical utility, and which can secure a lot of captured magnetic flux in a field system portion of a superconducting synchronous machine. It has now been found that by devising the construction of a field system portion of a superconducting synchronous machine or the construction of a magnetizing apparatus, the amount of captured magnetic flux in an object to be magnetized can be effectively increased while ensuring the practical utility. The finding led to the present invention.

The present invention has been made in view of the above situation. It is therefore an object of the present invention to provide a radial-gap type superconducting synchronous machine, a magnetizing apparatus and a magnetizing method which can effectively increase captured magnetic flux in an object to be magnetized while ensuring the practical utility.

Means for Solving the Problems

A radial-gap type superconducting synchronous machine according to the present invention comprises: a stator having a circular cross-sectional shape; a rotor rotatably supported inside the stator; and a superconductor disposed on the peripheral side of the rotor, wherein the rotor includes a rotor body secured to a rotating shaft, and a convex magnetic pole provided on the periphery of the rotor body, wherein the magnetic pole, at its distal end part, includes the superconductor, wherein when viewed in the direction of a rotational axis of the rotor, the magnetic pole center side of the superconductor is disposed nearer to the stator than the magnetic pole end side of the superconductor, and wherein a ferromagnet is disposed on the rotational axis side of the superconductor.

Preferably, in the radial-gap type superconducting synchronous machine, the superconductor is disposed in plural numbers at the distal end part of the magnetic pole, and the plurality of superconductors are disposed in such a stepped arrangement that when viewed in the direction of the rotational axis of the rotor, a superconductor closest to the center of the magnetic pole is located nearer to the stator than the other superconductors.

In the radial-gap type superconducting synchronous machine, the superconductor preferably has a rectangular shape as viewed from outside in the radial direction of the rotor.

Preferably, in the radial-gap type superconducting synchronous machine, the superconductor is disposed in plural numbers at the distal end part of the magnetic pole, and the plurality of superconductors are disposed at the distal end part of the magnetic pole such that they are arranged in the circumferential direction of the rotor, and that they are arranged in the direction of the rotational axis of the rotor.

A magnetizing apparatus according to the present invention comprises: a housing made of a ferromagnetic material, including a top wall portion, a peripheral wall portion vertically extending downward from a peripheral portion of the top wall portion, and a core portion located inside the peripheral wall portion and vertically extending downward from the inner surface of the top wall portion; a coil housed in the housing, the coil being wound around the core portion and covered by the top wall portion and the peripheral wall portion; and a current supply section for supplying an electric current to the coil, wherein the peripheral wall portion opens in the opposite direction from the top wall portion, and the height of the peripheral wall portion from the top wall portion is larger than the height of the core portion from the top wall portion, and wherein a disposition space for an object to be magnetized is formed in an area located opposite the distal end part of the core portion and located inside the peripheral wall portion.

In the magnetizing apparatus, the peripheral wall portion is preferably provided with a bottom wall portion made of a ferromagnetic material, extending from the distal end part of the peripheral wall portion toward the core portion; the bottom wall portion, when viewed in the direction in which the core portion vertically extends downward, extends to a position not overlapping the core portion; and the disposition space is formed in an area located opposite the distal end part of the core portion and located inside the inner periphery of the bottom wall portion.

A magnetizing method according to the present invention is a method for magnetizing a radial-gap type superconducting synchronous machine including a stator having a circular cross-sectional shape, a rotor rotatably supported inside the stator, and a superconductor disposed on the peripheral side of the rotor, said method comprising the steps of: preparing the radial-gap type superconducting synchronous machine wherein the rotor includes a rotor body secured to a rotating shaft, and a convex magnetic pole provided on the periphery of the rotor body, wherein the magnetic pole, at its distal end part, includes the superconductor, wherein when viewed in the direction of a rotational axis of the rotor, the magnetic pole center side of the superconductor is disposed nearer to the stator than the magnetic pole end side of the superconductor, and wherein a ferromagnet is disposed on the rotational axis side of the superconductor; disposing a magnetizing apparatus outside the superconductor in the radial direction of the rotor; and performing magnetization by directing magnetic flux lines from the magnetizing apparatus toward the superconductor.

The magnetizing apparatus preferably comprises: a housing made of a ferromagnetic material, including a top wall portion, a peripheral wall portion vertically extending downward from a peripheral portion of the top wall portion, and a core portion located inside the peripheral wall portion and vertically extending downward from the inner surface of the top wall portion; a coil housed in the housing, the coil being wound around the core portion and covered by the top wall portion and the peripheral wall portion; and a current supply section for supplying an electric current to the coil, wherein the peripheral wall portion opens in the opposite direction from the top wall portion, and the height of the peripheral wall portion from the top wall portion is larger than the height of the core portion from the top wall portion, and wherein a disposition space for an object to be magnetized is formed in an area located opposite the distal end part of the core portion and located inside the peripheral wall portion, and, in the step of disposing the magnetizing apparatus, the magnetizing apparatus is preferably disposed such that the superconductor of the radial-gap type superconducting synchronous machine is located in the disposition space of the magnetizing apparatus.

The present invention also provides a magnetizing method for magnetizing a radial-gap type superconducting synchronous machine including a stator having a circular cross-sectional shape, a rotor rotatably supported inside the stator, and a superconductor disposed on the peripheral side of the rotor, said method comprising the steps of: preparing a magnetizing apparatus comprising: a housing made of a ferromagnetic material, including a top wall portion, a peripheral wall portion vertically extending downward from a peripheral portion of the top wall portion, and a core portion located inside the peripheral wall portion and vertically extending downward from the inner surface of the top wall portion; a coil housed in the housing, the coil being wound around the core portion and covered by the top wall portion and the peripheral wall portion; and a current supply section for supplying an electric current to the coil, wherein the peripheral wall portion opens in the opposite direction from the top wall portion, and the height of the peripheral wall portion from the top wall portion is larger than the height of the core portion from the top wall portion, and wherein a disposition space for an object to be magnetized is formed in an area located opposite the distal end part of the core portion and located inside the peripheral wall portion; disposing the magnetizing apparatus outside the superconductor of the radial-gap type superconducting synchronous machine in the radial direction of the rotor, with the superconductor being located in the disposition space of the magnetizing apparatus, and the distal end part of the core portion of the magnetizing apparatus being oriented toward the superconductor; and performing magnetization by directing magnetic flux lines from the magnetizing apparatus toward the superconductor.

In the magnetizing apparatus, the peripheral wall portion is preferably provided with a bottom wall portion made of a ferromagnetic material, extending from the distal end part of the peripheral wall portion toward the core portion; the bottom wall portion, when viewed in the direction in which the core portion vertically extends downward, extends to a position not overlapping the core portion; and the disposition space is formed in an area located opposite the distal end part of the core portion and located inside the inner periphery of the bottom wall portion, and, in the step of disposing the magnetizing apparatus, the magnetizing apparatus is preferably disposed such that the superconductor in the disposition space of the magnetizing apparatus is located nearer to the core portion than the bottom wall portion.

In the step of performing magnetization, application of static magnetic field to the superconductor may be started under conditions that the temperature of the superconductor is higher than its superconducting transition temperature and, after the magnetic flux density of the static magnetic field has reached a predetermined target value, the temperature of the superconductor may be lowered to a predetermined temperature lower than the superconducting transition temperature while keeping the magnetic flux density at the target value, and then the magnetic field applied by the magnetizing apparatus may be eliminated.

Advantageous Effects of the Invention

According to the radial-gap type superconducting synchronous machine of the present invention, when the superconductor disposed on the peripheral side of the rotor is magnetized by a magnetizing apparatus from outside in the radial direction of the rotor, a lot of magnetic flux lines from the magnetizing apparatus pass through the superconductor and are guided to the ferromagnet disposed on the rotational axis side of the superconductor. This enables concentrated magnetic flux lines to pass through the superconductor. Accordingly, the superconductor can be magnetized with high efficiency even when, for example, the coil of the magnetizing apparatus is disposed outside the superconductor in the radial direction of the rotor and at a distance from the superconductor, and the coil is not a large-sized one surrounding the superconductor. A sufficient captured magnetic flux can therefore be ensured in the superconductor even when magnetization is performed by a magnetizing apparatus which is not large-sized. Thus, captured magnetic flux in the superconductor can be effectively increased while ensuring the practical utility. This makes it possible to increase the torque and the power output of the synchronous machine.

In the radial-gap type superconducting synchronous machine of the present invention, when viewed in the direction of the rotational axis of the rotor, the magnetic pole center side of the superconductor is disposed nearer to the stator than the magnetic pole end side. Thus, the superconductor is disposed such that it follows the arc-shaped inner surface of the stator. This can reduce the gap between the superconductor and the stator, thereby making it possible to allow a magnetic field from the superconductor to efficiently act on the stator.

In the radial-gap type superconducting synchronous machine of the present invention, after the superconductor is magnetized by a magnetizing apparatus, the magnetized superconductor is attracted by the magnetic force to a magnetic portion of the magnetizing apparatus while, at the same time, the superconductor is attracted to the ferromagnet located on the rotational axis side of the superconductor. This can prevent the superconductor from moving toward the magnetizing apparatus, thus enabling the superconductor to be held in the initial installation position.

In the case where the superconductor is disposed in plural numbers at the distal end part of the magnetic pole, and the plurality of superconductors are disposed in such a stepped arrangement that when viewed in the direction of the rotational axis of the rotor, a superconductor closest to the center of the magnetic pole is located nearer to the stator than the other superconductors, the superconductor closest to the center of the magnetic pole can be easily disposed close to the stator.

In the case where the superconductor has a rectangular shape as viewed from outside in the radial direction of the rotor, the superconductor can efficiently capture magnetic flux lines, and the total amount of magnetic flux in the superconductor can be increased. This can increase the torque and the power output of the synchronous machine.

In the case where the superconductor is disposed in plural numbers at the distal end part of the magnetic pole, and the plurality of superconductors are disposed such that they are arranged in the circumferential direction of the rotor, and that they are arranged in the direction of the rotational axis of the rotor, a wide magnetic flux capturing area can be ensured with ease. This can increase the total amount of magnetic flux in magnetic flux capturing area, thereby increasing the torque and the power output of the synchronous machine.

According to the magnetizing apparatus of the present invention, the coil is covered by the top wall portion and the peripheral wall portion of the housing made of ferromagnetic material, and the peripheral wall portion opens in the opposite direction from the top wall portion. A magnetic circuit is therefore formed in which magnetic flux flows in the following order: one end part (distal end part) of the core portion→the peripheral wall portion→the top wall portion→the other end part (proximal end part) of the core portion, or in the following order: the other end part (proximal end part) of the core portion→the top wall portion→the peripheral wall portion→the one end part (distal end part) of the core portion. Since the height of the peripheral wall portion from the top wall portion is larger than the height of the core portion from the top wall portion, magnetic flux lines in the magnetic circuit, coming from the one end part (distal end part) of the core portion and reaching the peripheral wall portion, or coming from the peripheral wall portion and reaching the one end part (distal end part) of the core portion, are dense (concentrated) in the disposition space lying inside the peripheral wall portion. This makes it possible to effectively ensure a high magnetic flux density on a line extending from the one end part of the core portion in the disposition space. It therefore becomes possible to pass a high-density magnetic flux through an object to be magnetized on the line extending from the one end part of the core portion in the disposition space, thus enabling high-efficiency magnetization of the object even when the coil of the magnetizing apparatus is disposed at a distance from the object, and the coil is not a large-sized one surrounding the object. A sufficient captured magnetic flux can therefore be ensured in the object even when magnetization is performed by the magnetizing apparatus which is not large-sized. Thus, according to the magnetizing apparatus of the present invention, captured magnetic flux in the object can be effectively increased while ensuring the practical utility.

According to the magnetizing apparatus of the present invention, sufficient captured magnetic flux can be ensured in an object to be magnetized even when the coil lies at a distance from the object. Thus, the degree of freedom of disposition that can ensure sufficient captured magnetic flux for the object can be enhanced. The practical utility can be ensured also in this respect. Even when the magnetizing apparatus is disposed in proximity to a magnetic pole, as an object to be magnetized, of e.g. a multi-pole rotor, the magnetizing apparatus can be prevented from interfering with the neighbor magnetic pole(s). Sufficient captured magnetic flux can therefore be ensured in each of the magnetic poles of the rotor.

In the case where the peripheral wall portion is provided with the bottom wall portion made of a ferromagnetic material, extending from the distal end part of the peripheral wall portion toward the core portion and, when viewed in the direction in which the core portion vertically extends downward, extending to a position not overlapping the core portion, and the disposition space is formed in an area located opposite the distal end part of the core portion and located inside the inner periphery of the bottom wall portion, magnetic flux lines flow from the one end part (distal end part) of the core portion and reach the bottom wall portion, or flow from the bottom wall portion and reach the one end part (distal end part) of the core portion. The magnetic flux lines can therefore be made denser (more concentrated) on a line extending from the one end part of the core portion in the disposition space. This makes it possible to more effectively ensure a high magnetic flux density on the line extending from the one end part of the core portion in the disposition space, thereby further increasing the efficiency of magnetization of an object to be magnetized.

According to the magnetizing method of the present invention which comprises preparing the radial-gap type superconducting synchronous machine in which the ferromagnet is disposed on the rotational axis side of the superconductor, and magnetizing the synchronous machine, when the superconductor disposed on the peripheral side of the rotor is magnetized by a magnetizing apparatus from outside in the radial direction of the rotor, a lot of magnetic flux lines from the magnetizing apparatus pass through the superconductor and are guided to the ferromagnet disposed on the rotational axis side of the superconductor. This enables concentrated magnetic flux lines to pass through the superconductor. Accordingly, the superconductor can be magnetized with high efficiency even when, for example, the coil of the magnetizing apparatus is disposed outside the superconductor in the radial direction of the rotor and at a distance from the superconductor, and the coil is not a large-sized one surrounding the superconductor. A sufficient captured magnetic flux can therefore be ensured in the superconductor even when magnetization is performed by a magnetizing apparatus which is not large-sized. Thus, captured magnetic flux in the superconductor can be effectively increased while ensuring the practical utility. This makes it possible to increase the torque and the power output of the synchronous machine.

According to the magnetizing method of the present invention which comprises preparing the magnetizing apparatus including the coil housed in the housing made of a ferromagnetic material, and magnetizing the synchronous machine, the coil is covered by the top wall portion and the peripheral wall portion of the housing made of ferromagnetic material, and the peripheral wall portion opens in the opposite direction from the top wall portion. A magnetic circuit is therefore formed in which magnetic flux flows in the following order: one end part (distal end part) of the core portion→the peripheral wall portion→the top wall portion→the other end part (proximal end part) of the core portion, or in the following order: the other end part (proximal end part) of the core portion→the top wall portion→the peripheral wall portion→the one end part (distal end part) of the core portion. Since the height of the peripheral wall portion from the top wall portion is larger than the height of the core portion from the top wall portion, magnetic flux lines in the magnetic circuit, coming from the one end part (distal end part) of the core portion and reaching the peripheral wall portion, or coming from the peripheral wall portion and reaching the one end part (distal end part) of the core portion, are dense (concentrated) in the disposition space lying inside the peripheral wall portion. This makes it possible to effectively ensure a high magnetic flux density on a line extending from the one end part of the core portion in the disposition space. It therefore becomes possible to pass a high-density magnetic flux through an object to be magnetized on the line extending from the one end part of the core portion in the disposition space, thus enabling high-efficiency magnetization of the object even when the coil of the magnetizing apparatus is disposed at a distance from the object, and the coil is not a large-sized one surrounding the object. A sufficient captured magnetic flux can therefore be ensured in the object even when magnetization is performed by the magnetizing apparatus which is not large-sized. Thus, according to the magnetizing apparatus of the present invention, captured magnetic flux in the object can be effectively increased while ensuring the practical utility.

In the case of using the magnetizing apparatus including the coil housed in the housing made of a ferromagnetic material, sufficient captured magnetic flux can be ensured in an object to be magnetized even when the coil lies at a distance from the object. Thus, the degree of freedom of disposition that can ensure sufficient captured magnetic flux for the object can be enhanced. The practical utility can be ensured also in this respect. In particular, even when the magnetizing apparatus is disposed in proximity to a magnetic pole, as an object to be magnetized, of a multi-pole rotor, the magnetizing apparatus can be prevented from interfering with the neighbor magnetic pole(s). Sufficient captured magnetic flux can therefore be ensured in each of the magnetic poles of the rotor.

High-efficiency magnetization of a superconductor can be performed effectively especially when the radial-gap type superconducting synchronous machine having the ferromagnet disposed on the rotational axis side of the superconductor is magnetized by means of the magnetizing apparatus including the coil housed in the housing made of a ferromagnetic material.

In the case where in the magnetizing apparatus, the peripheral wall portion is provided with the bottom wall portion made of a ferromagnetic material, extending from the distal end part of the peripheral wall portion toward the core portion and, when viewed in the direction in which the core portion vertically extends downward, extending to a position not overlapping the core portion, and the disposition space is formed in an area located opposite the distal end part of the core portion and located inside the inner periphery of the bottom wall portion, the magnetizing apparatus is preferably disposed such that the superconductor in the disposition space of the magnetizing apparatus is located nearer to the core portion than the bottom wall portion. This enables effective magnetization of the superconductor with a high-density magnetic flux.

BRIEF DESCRIPTION OF THE DRAWINGS

FIG. 13 is a diagram showing a table summarizing the performance of a radial-gap type superconducting synchronous machine of Example and the performances of conventional synchronous machines of Comp. Examples 1 to 3.

DESCRIPTION OF THE EMBODIMENTS

Embodiments of the present invention will now be described with reference to the drawings.

(Radial-Gap Type Superconducting Synchronous Machine)

Figure 1:
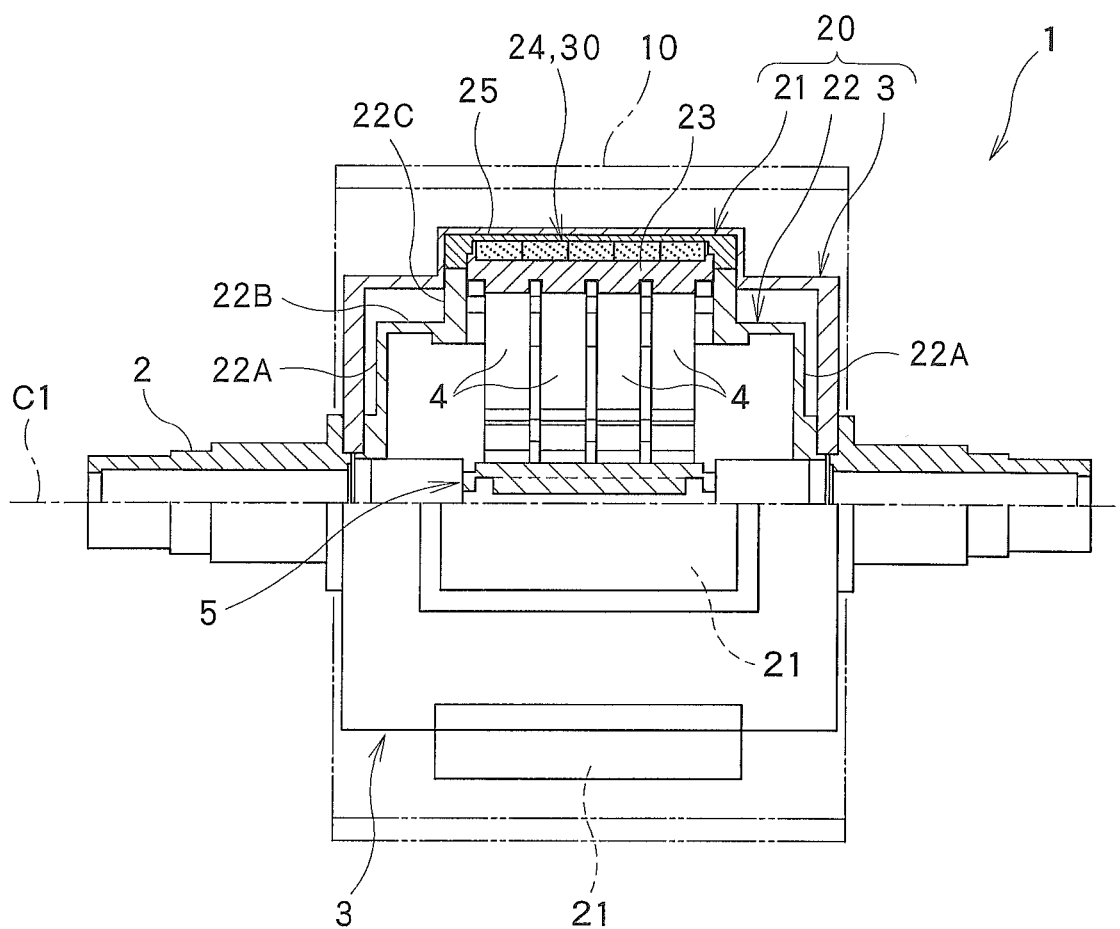
FIG. 1 is a half cross-sectional side view of a radial-gap type superconducting synchronous machine according to an embodiment of the present invention.

A radial-gap type superconducting synchronous machine 1 according to an embodiment of the present invention will be described first. FIG. 1 is a half cross-sectional side view of the radial-gap type superconducting synchronous machine 1.

As shown in FIG. 1, the radial-gap type superconducting synchronous machine 1 includes a stator 10 having a circular cross-sectional shape, shown by the two-dot chain lines in FIG. 1, and a rotor 20 rotatably supported inside the stator 10.

The radial-gap type superconducting synchronous machine 1 is a rotating field system-type synchronous machine; the stator 10 is provided with a not-shown armature coil, and the rotor 20 on the field system side is provided with magnetic poles 21. The rotor 20 is secured to a rotating shaft 2 extending on the rotational axis shown as C1 in FIG. 1, so that the rotor 20 can rotate, together with the rotating shaft 2, on the rotational axis C1. A direction along the rotational axis C1 is hereinafter referred to as the rotational axis C1 direction, a direction perpendicular to the rotational axis C1 as the radial direction or radially, and a direction around the rotational axis C1 as the circumferential direction.

Figure 2:
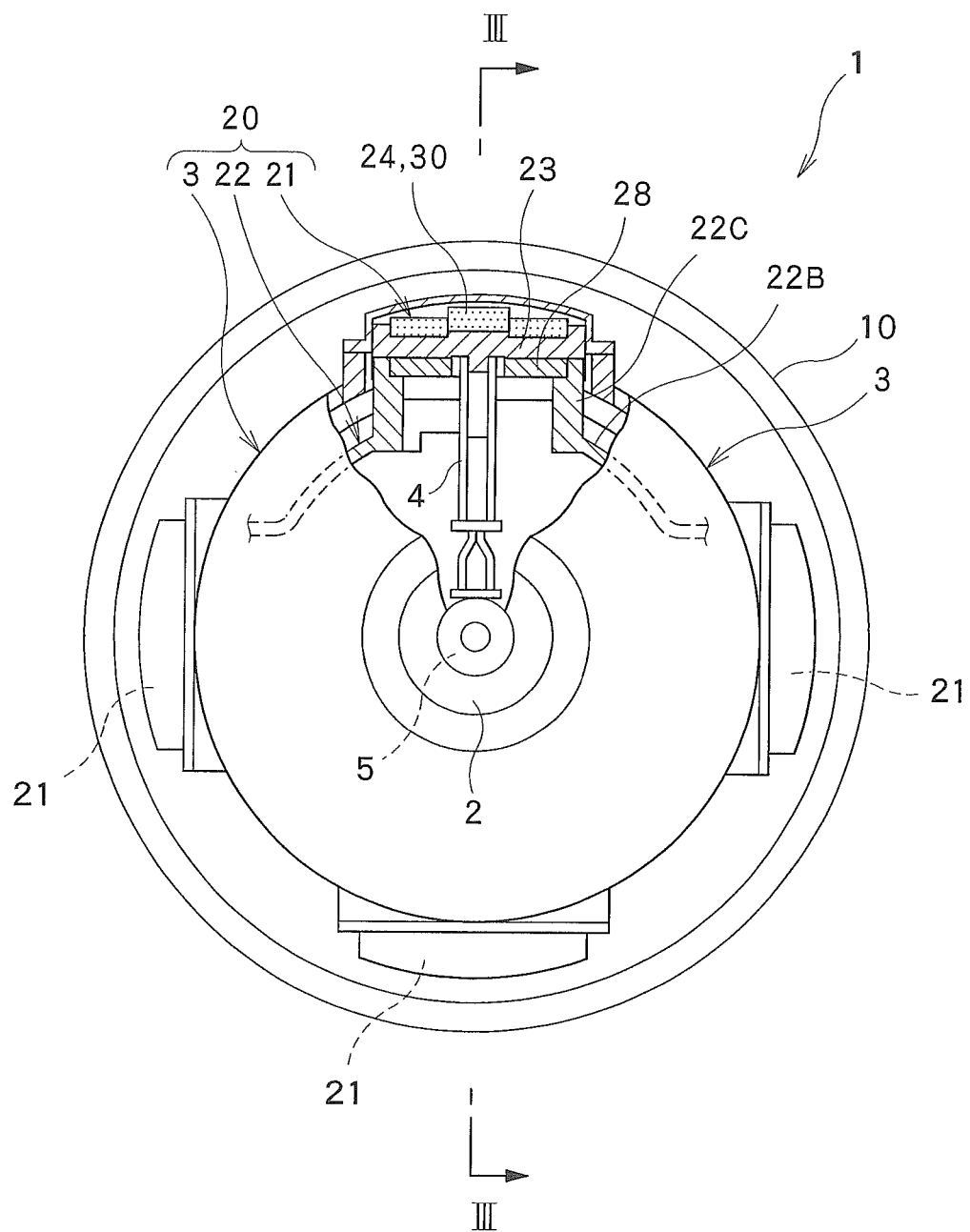
FIG. 2 is a diagram of the radial-gap type superconducting synchronous machine shown in FIG. 1, as viewed in the direction of the rotational axis.

FIG. 2 is a diagram of the radial-gap type superconducting synchronous machine 1 as viewed in the rotational axis C1 direction. As shown in FIGS. 1 and 2, the rotor 20 includes a rotor body 22 comprising a pair of disk portions 22A, secured to the rotating shaft 2 and extending in the radial direction, and a cylindrical drum portion 22B connecting the peripheries of the disks 22A, four convex magnetic poles 21 secured to the periphery of the drum portion 22B of the rotor body 22, and a generally-cylindrical vacuum cover 3 closed at both ends and hermetically covering the exteriors of the rotor body 22 and the magnetic poles 21.

In particular, four magnetic pole fixing portions 22C, each having a rectangular frame-shaped cross-section and projecting outward in the radial direction, are formed on the periphery of the drum portion 22B of the rotor body 22 at regular intervals in the circumferential direction. Each magnetic pole 21 is fixed to the distal end part of a corresponding one of the magnetic pole fixing portions 22C. The rotor body 22 of this embodiment is formed mainly of non-magnetic stainless steel.

The rotor body 22 and the vacuum cover 3 are each secured integrally to the rotating shaft 2 so that the rotor body 22 and the vacuum cover 3 can rotate, together with the rotating shaft 2, on the rotational axis C1.

The vacuum cover 3 is provided to form a vacuum insulating layer between it and the rotor body 22/the magnetic poles 21, thereby insulating the rotor 20 from the outside. The vacuum cover 3 of this embodiment is formed mainly of non-magnetic stainless steel; however, it may be formed of an aluminum alloy or the like. The vacuum cover 3, in the periphery, has convex projecting portions that cover the magnetic poles 21.

Figure 3:
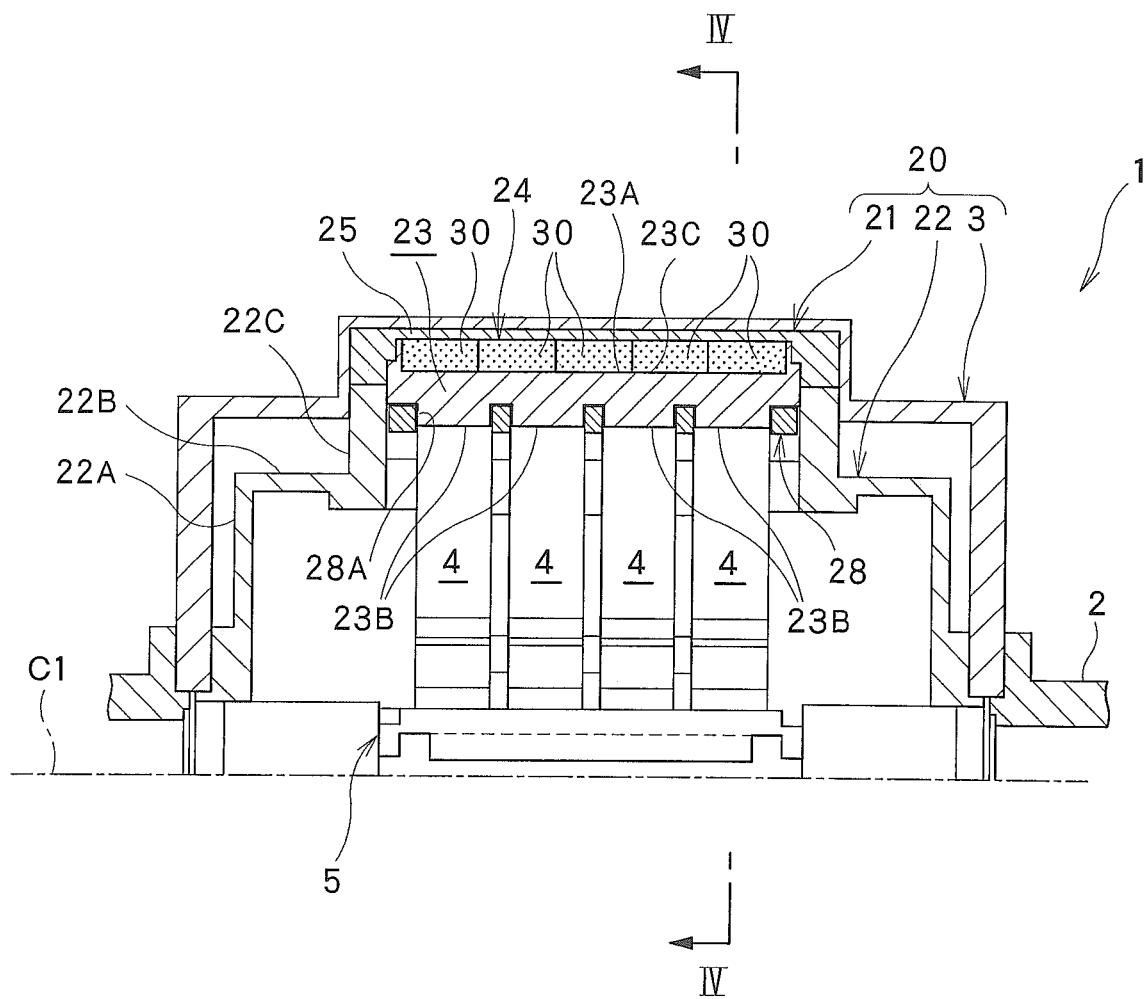
FIG. 3 is a cross-sectional view taken along the line III-III of FIG. 2.
Figure 4:
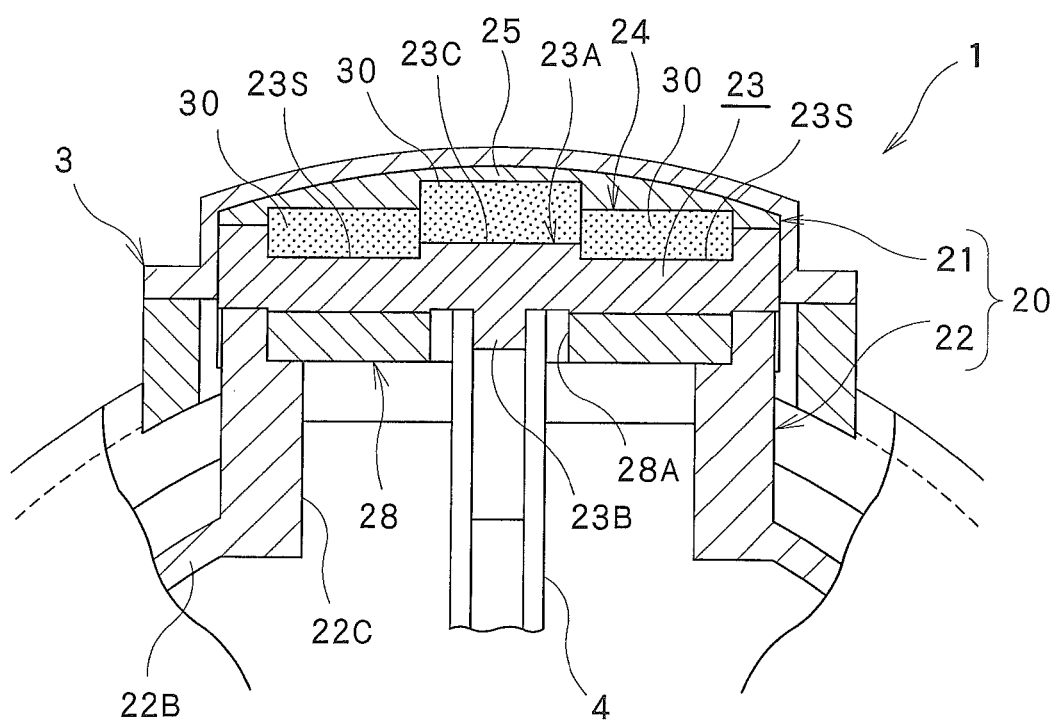
FIG. 4 is a cross-sectional view taken along the line IV-IV of FIG. 3.

FIG. 3 is a cross-sectional view taken along the line III-Ill of FIG. 2, and FIG. 4 is a cross-sectional view taken along the line IV-IV of FIG. 3. As shown in FIGS. 3 and 4, the magnetic poles 21 of this embodiment each include a cooling base member 23 having a rectangular plate-like shape and secured to the magnetic pole fixing portion 22C of the rotor body 22, a bulk aggregate 24 consisting of a plurality of bulk superconductors 30, disposed radially outside the cooling base member 23 and located on the distal end part side of the magnetic pole 21, and a bulk fixing member 25 disposed radially outside the bulk aggregate 24 and which sandwiches and fixes the bulk aggregate 24 between it and the cooling base member 23.

The cooling base members 23 of this embodiment are formed of OFHC (oxygen-free high conductivity) copper. As shown in FIG. 4, an installation surface 23A for installation of the bulk superconductors 30 of the bulk aggregate 24 is formed in the radially outer surface of each cooling base member 23. The installation surface 23A, when viewed in the rotational axis C1 direction, has a central portion 23C located centrally (in the center of the magnetic pole 21), and side portions 23S located on both sides of the central portion 23C. The central portion 23C projects radially outward (toward the stator 10) from the side portions 23S. Further, as shown in FIG. 3, the central portion 23C and the side portions 23S extend parallel to the rotational axis C1 direction.

On the other hand, as shown in FIG. 4, connecting portions 23B projecting radially inward are formed on the radially inner surface of each cooling base member 23. A heat-transfer member 4 made of, for example, a copper material is connected to each connecting portion 23B. As shown in FIGS. 1 and 2, the heat-transfer members 4 extend radially inward from the connecting portions 23B, and are connected to a heat exchanger 5 installed in a portion, covered by the rotor 20, of the rotating shaft 2.

A refrigerant such as neon, which has passed through the interior of the rotating shaft 2, is supplied into the heat exchanger 5. The heat of the bulk aggregate 24 is transferred via the cooling base member 23 and the heat-transfer members 4 to the heat exchanger 5, and absorbed by the heat exchanger 5. The bulk superconductors 30 of the bulk aggregate 24, installed on the cooling base member 23, can thus be maintained at a low temperature (not more than their superconducting transition temperature).

Figure 5:
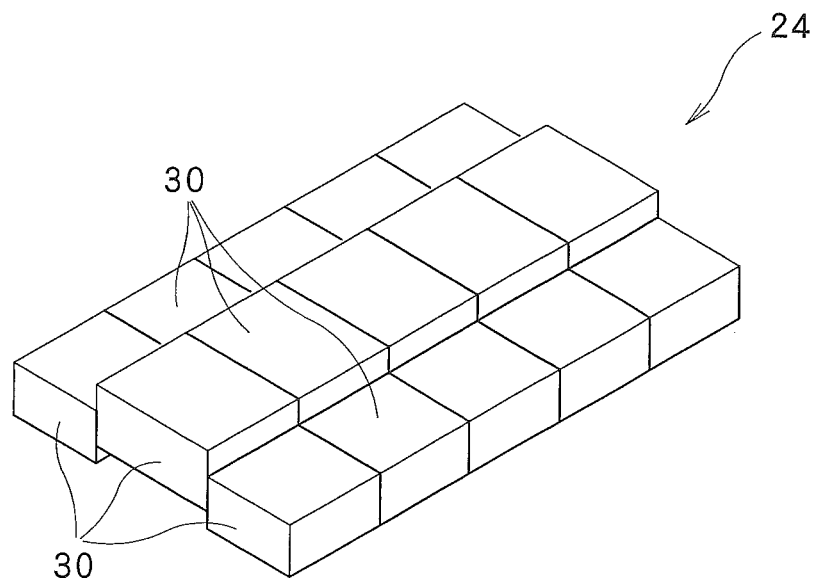
FIG. 5 is a perspective view of bulk superconductors provided in a magnetic pole of the radial-gap type superconducting synchronous machine shown in FIG. 1.

FIG. 5 is a perspective view of the bulk superconductors 30 constituting the bulk aggregate 24. As shown in FIGS. 3 through 5, in this embodiment the bulk superconductors 30 of the bulk aggregate 24 each have a rectangular shape as viewed from radially outside, and also have a rectangular shape in a radial cross-section. GdBCO ($GdBa_2Cu_3O_{7-z}$), which is a so-called high-temperature bulk superconducting material, is used as the bulk superconductors 30.

In this embodiment 15 bulk superconductors 30 are disposed in a 3×5 arrangement on the installation surface 23A of each cooling base member 23. In particular, as shown in FIGS. 3 through 5, when viewed in the rotational axis C1 direction, one bulk superconductor 30 is disposed on each of the central portion 23C and the side portions 23S of the installation surface 23A of each cooling base member 23 such that the three bulk superconductors 30 are arranged in the circumferential direction of the rotational axis C1. Further, in a side view, the bulk superconductors 30 are disposed such that 5 bulk superconductors 30 are arranged in the rotational axis C1 direction on each of the central portion 23C and the two side portions 23S. Any two adjacent bulk superconductors 30 are disposed in contact with each other, and thus the bulk superconductors 30 are densely aggregated.

In this embodiment the bulk aggregate 24, consisting of the bulk superconductors 30 arranged in such a manner, has a rectangular contour elongated in the rotational axis C1 direction.

Further, as shown in FIG. 4, in this embodiment the central portion 23C of the installation surface 23A projects radially outward (toward the stator 10) from the side portions 23S. Therefore, when viewed in the rotational axis C1 direction, the bulk superconductors 30 are disposed in the stepped arrangement. Thus, when viewed in the rotational axis C1 direction, the bulk superconductor 30 closest to the center of each magnetic pole 21 is located nearer to the stator 10 than the other bulk superconductors 30.

On the other hand, as shown in FIG. 3, the bulk fixing member 25 is secured to the magnetic pole fixing portion 22C, and sandwiches the bulk aggregate 24 between it and the cooling base member 23 to hold the bulk superconductors 30 of the bulk aggregate 24. The bulk fixing member 25 of this embodiment is formed of a non-magnetic material.

In this embodiment a ferromagnet 28 is disposed on the rotational axis C1 side of the thus-constructed magnetic pole 21 (the bulk aggregate 24). As shown in FIGS. 3 and 4, the ferromagnet 28 is disposed in close proximity to the cooling base member 23 of the magnetic pole 21.

Figure 6:
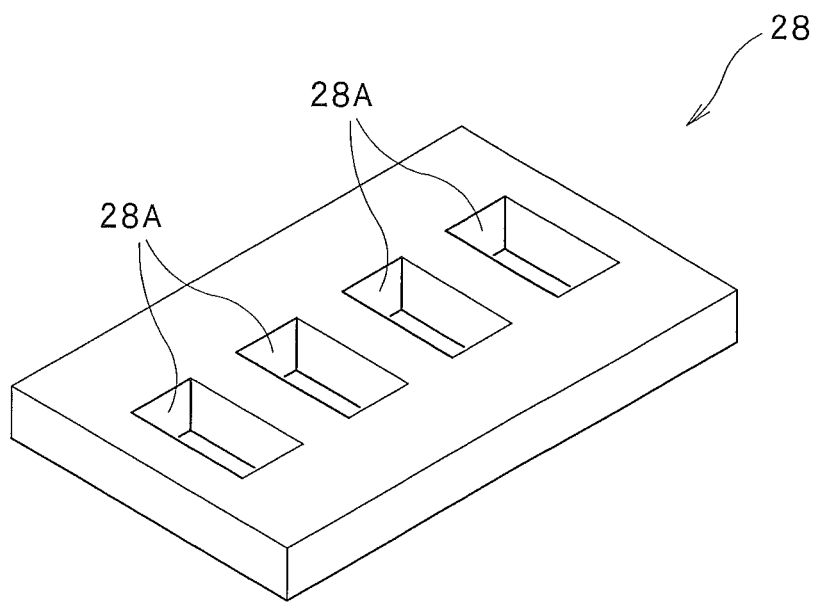
FIG. 6 is a perspective view of a ferromagnet provided in the radial-gap type superconducting synchronous machine shown in FIG. 1.

The ferromagnet 28 of this embodiment is formed of a ferromagnetic metal material composed mainly of iron. FIG. 6 is a perspective view of the ferromagnet 28. As shown in FIG. 6, the ferromagnet 28 has a rectangular plate-like shape and has through-holes 28A for passage of the above-described heat-transfer members 4 therethrough.

As shown in FIGS. 3 and 4, the ferromagnet 28 is disposed in close proximity to the cooling base member 23, with the heat-transfer members 4 being inserted into the through-holes 28A, and is fixed to the magnetic pole fixing portion 22C. The ferromagnet 28 has a larger size than the bulk aggregate 24 when viewed in the radial direction, and is disposed such that it covers the entire bulk aggregate 24 from inside.

The above-described radial-gap type superconducting synchronous machine 1 is subjected to magnetization of the bulk superconductors 30 of the bulk aggregate 24 with the below-described magnetizing apparatus 100. The ferromagnet 28 can guide magnetic flux lines from the magnetizing apparatus 100 so that they pass through the bulk aggregate 24 during the magnetization and, in addition, can stably keep the bulk aggregate 24 in the initial installation position after the magnetization of the bulk aggregate 24. The details will be described below.

(Magnetizing Apparatus)

Figure 7:
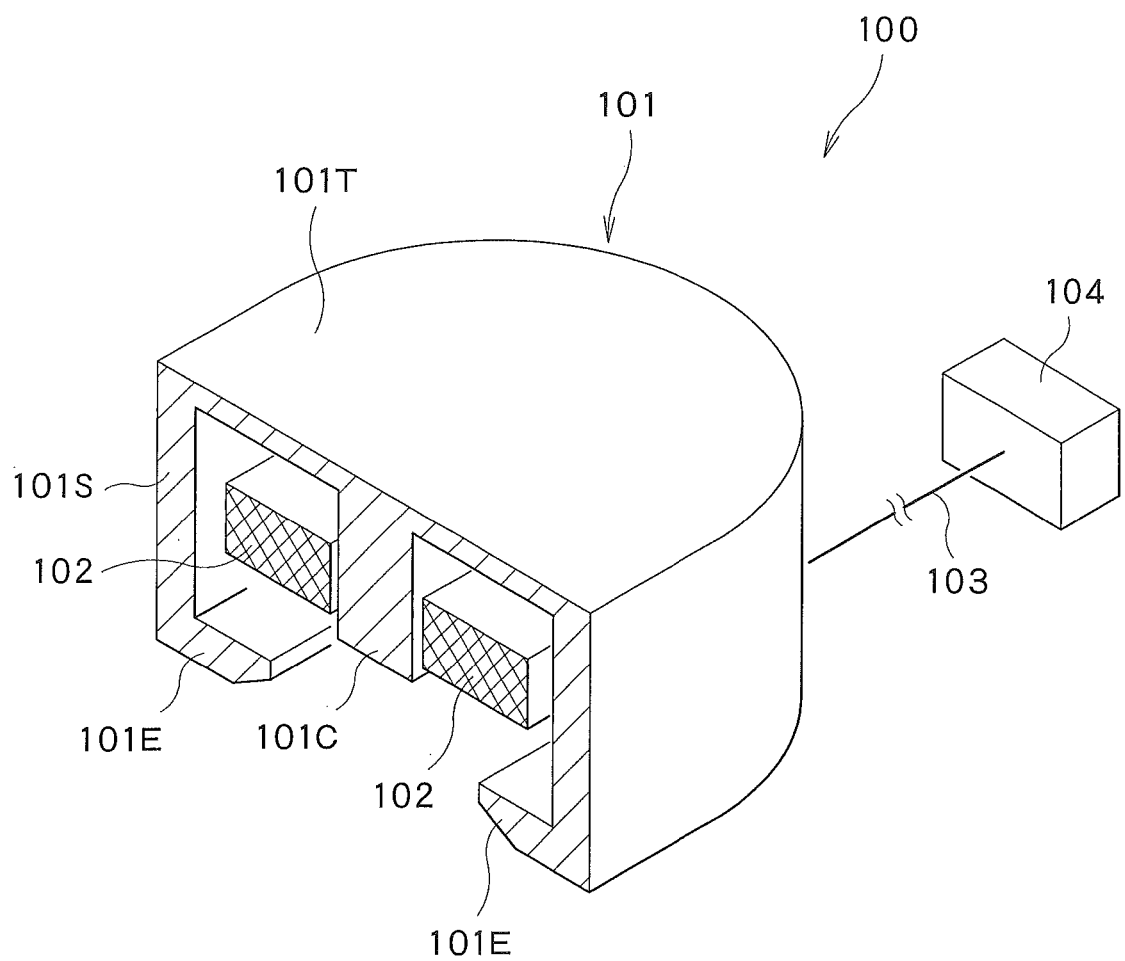
FIG. 7 is a perspective view of a magnetizing apparatus according to an embodiment of the present invention, with a portion of the magnetizing apparatus being shown in cross-section.

Next, a magnetizing apparatus 100 according to an embodiment of the present invention will now be described. The magnetizing apparatus 100 can be used to magnetize the bulk superconductors 30 of each bulk aggregate 24 of the above-described radial-gap type superconducting synchronous machine 1. FIG. 7 is a perspective view of the magnetizing apparatus 100, FIG. 8A is a vertical cross-sectional view of the magnetizing apparatus 100, and FIG. 8B is a diagram illustrating part of magnetic flux lines generated by the magnetizing apparatus 100.

Figure 8A:
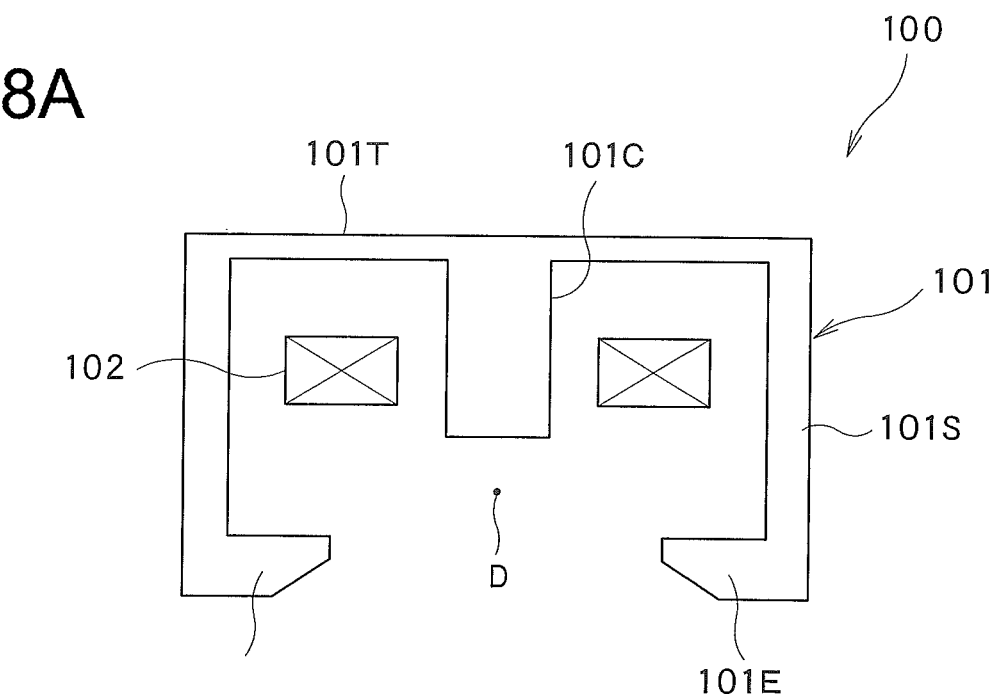
FIGS. 8A and 8B are diagrams illustrating the magnetizing apparatus shown in FIG. 7, FIG. 8A being a vertical cross-sectional view of the magnetizing apparatus, and FIG. 8B illustrating part of magnetic flux lines generated by the magnetizing apparatus.
Figure 8B:
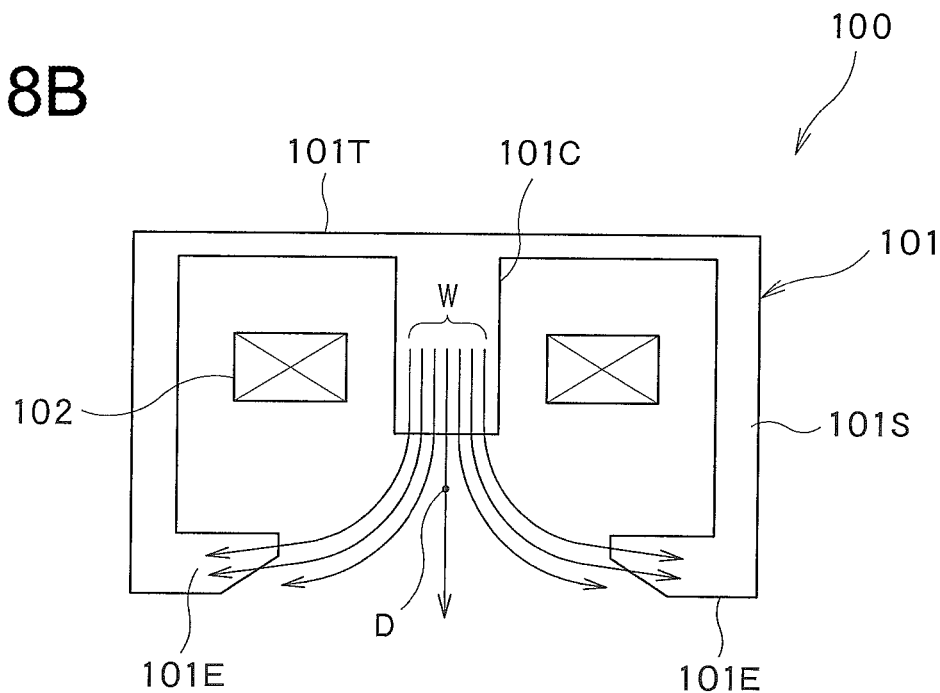

As shown in FIGS. 7 and 8A, the magnetizing apparatus 100 of this embodiment includes a housing 101 made of a ferromagnetic material, including a top wall portion 101T, a peripheral wall portion 101S vertically extending downward from a peripheral portion of the top wall portion 101T, and a core portion 101C located inside the peripheral wall portion 101S and vertically extending downward from the inner surface of the top wall portion 101T. In particular, the housing 101 is formed of a ferromagnetic metal material composed mainly of iron. In a cross-sectional view, the core portion 101C is located in an intermediate area between the opposing peripheral wall portions 101S. The peripheral wall portion 101S opens in the opposite direction from the top wall portion 101T.

In the housing 101 is housed a superconducting coil (hereinafter referred to simply as coil) 102 wound around the core portion 101C and covered by the top wall portion 101T and the peripheral wall portion 101S. The coil 102 is formed of a superconducting material (Bi2233 ($Bi_2Sr_2Ca_2Cu_3O_{10+\delta}$) in this embodiment), and is connected to a current supply section 104 by a connecting wire 103 drawn out of the housing 101. A magnetic field is generated by the coil 102 by supplying an electric current from the current supply section 104 to the coil 102.

The housing 101 has a generally-rectangular contour, and the core portion 101C has an elongated shape extending in the longitudinal direction of the housing 101. The length of the core portion 101C in the longitudinal direction is equal to the length of the bulk aggregate 24 of the radial-gap type superconducting synchronous machine 1 in the rotational axis C1 direction (see FIG. 3).

The coil 102, which is wound around the core portion 101C, also has a generally-rectangular contour. The coil 102 is composed of generally-rectangular multi-layer wire windings.

The housing 101 will now be described in detail. As shown in FIG. 8A, the height of the peripheral wall portion 101S from the top wall portion 101T is larger than the height of the core portion 101C from the top wall portion 101T. In this embodiment, a bottom wall portion 101E, extending from the distal end part of the peripheral wall portion 101S toward the core portion 101C, is formed integrally with the peripheral wall portion 101S. In this embodiment the bottom wall portion 101E, formed integrally with the peripheral wall portion 101S, is also made of a ferromagnetic material.

In this embodiment, when viewed in the direction in which the core portion 101C vertically extends (projects) downward, the bottom wall portion 101E extends to a position not overlapping the core portion 101C. A disposition space D for an object to be magnetized is formed in an area located inside the inner periphery of the bottom wall portion 101E and located opposite the distal end part of the core portion 101C in the direction in which the core portion 101C vertically extends (projects) downward. Particularly in this embodiment, the object to be magnetized is the bulk aggregate 24 of each magnetic pole 21 of the radial-gap type superconducting synchronous machine 1. Therefore, the bottom wall portion 101E has such an open structure as to be capable of inserting the magnetic pole 21 through the space inside the inner periphery of the bottom wall portion 101E and positioning the bulk aggregate 24 in the disposition space D.

In the above-described magnetizing apparatus 100, the coil 102 is covered by the top wall portion 101T and the peripheral wall portion 101S of the housing 101 made of ferromagnetic material, and the peripheral wall portion 101S opens in the opposite direction from the top wall portion 101T. A magnetic circuit is therefore formed in which magnetic flux flows e.g. in the following order: one end part (distal end part) of the core portion 101C→the bottom wall portion 101E→the peripheral wall portion 101S→the top wall portion 101T→the other end part (proximal end part) of the core portion 101C. Since the height of the peripheral wall portion 101S from the top wall portion 101T is larger than the height of the core portion 101C from the top wall portion 101T, magnetic flux lines W in the magnetic circuit, coming from the one end part (distal end part) of the core portion 101C and reaching the peripheral wall portion 101S (bottom wall portion 101E), are dense (concentrated) in the disposition space D lying inside the peripheral wall portion 101S and the bottom wall portion 101E, as shown in FIG. 8B. This makes it possible to effectively ensure a high magnetic flux density on a line extending from the one end part of the core portion 101C in the disposition space D. It therefore becomes possible to pass a high-density magnetic flux through an object to be magnetized on the line extending from the one end part of the core portion 101C in the disposition space D, thus enabling high-efficiency magnetization of the object.

Figure 9:
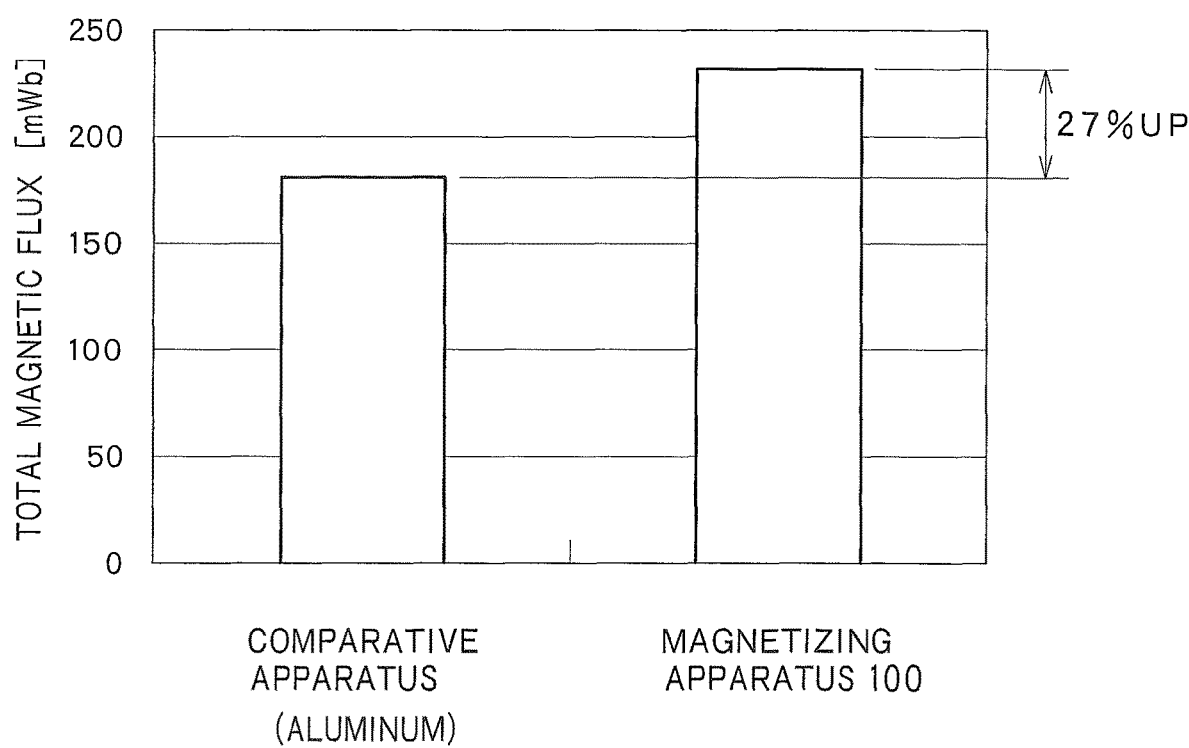
FIG. 9 is a diagram showing a graph indicating effective concentration of magnetic flux lines during magnetization with the magnetizing apparatus shown in FIG. 7.

FIG. 9 shows a graph indicating effective concentration of magnetic flux lines during magnetization with the magnetizing apparatus 100, i.e. indicating that the total magnetic flux, generated by the magnetizing apparatus 100 for an object to be magnetized, is effectively ensured. The graph shows data on the total magnetic flux of a magnetic field generated by the magnetizing apparatus 100 in comparison with data on the total magnetic flux of a magnetic field generated by a magnetizing apparatus (comparative magnetizing apparatus) in which a portion, corresponding to the housing 101 of the magnetizing apparatus 100, is formed of an aluminum alloy which is not a ferromagnetic material. The total magnetic flux refers to the total amount of magnetic flux present in the entire disposition space D.

As can be seen in FIG. 9, the total magnetic flux of the magnetic field generated by the magnetizing apparatus 100 is considerably higher, in particular by about 27%, than the total magnetic flux of the magnetic field generated by the comparative magnetizing apparatus.

(Magnetizing Method)

Figure 10:
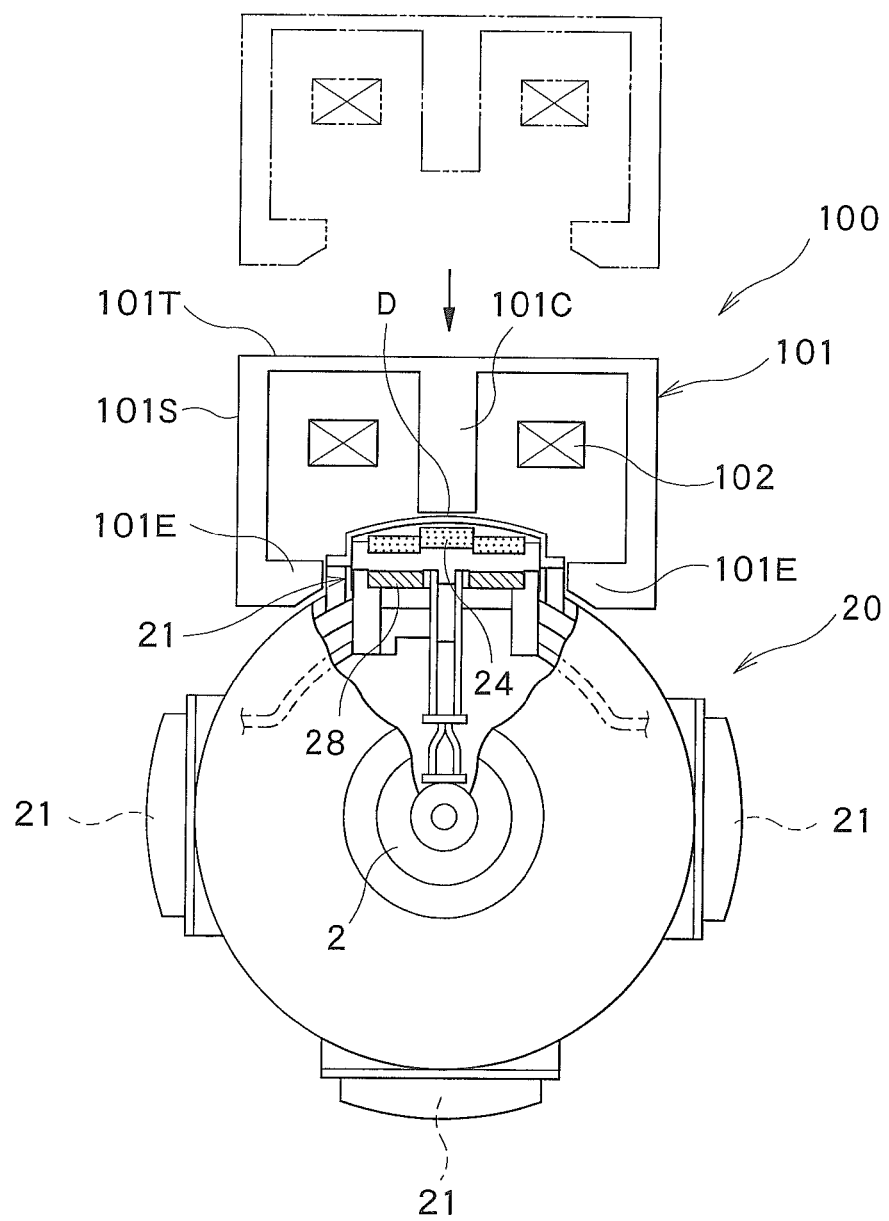
FIG. 10 is a diagram illustrating how the radial-gap type superconducting synchronous machine shown in FIG. 1 is magnetized by the magnetizing apparatus shown in FIG. 7.

Next, a method for magnetizing the radial-gap type superconducting synchronous machine 1 by using the magnetizing apparatus 100 will now be described. FIG. 10 is a diagram illustrating how the magnetization is performed.

When performing the magnetization with the magnetizing apparatus 100, the rotor 20 of the radial-gap type superconducting synchronous machine 1 is first taken out of the stator 10. Thereafter, as shown in FIG. 10, one magnetic pole 21 of the rotor 20 is inserted into the disposition space D of the magnetizing apparatus 100, and the magnetizing apparatus 100 comes to lie radially outside the magnetic pole 21 such that the bulk aggregate 24 of the magnetic pole 21 in the disposition space D is located opposite to and in close proximity to the core portion 101C. In particular, in this embodiment the magnetizing apparatus 100 is to be disposed such that the bulk aggregate 24 in the disposition space D is located nearer to the core portion 101C than the inner surface of the bottom wall portion 101E of the housing 101, and that the ferromagnet 28 of the radial-gap type superconducting synchronous machine 1 is located nearer to the core portion 101C than the outer surface of the bottom wall portion 101E. In the illustrated embodiment, the magnetic pole 21 of the rotor 20 is inserted into the disposition space D by lowering the magnetizing apparatus 100. The projecting portion of the vacuum cover 3, covering the magnetic pole 21, is also disposed in the disposition space D.

Subsequently, an electric current is supplied from the current supply section 104 (see FIG. 7) to the coil 102 to generate a magnetic field. In this embodiment magnetization is effected by directing the magnetic flux lines of the magnetizing apparatus 100 from the distal end part of the core portion 101C toward the bulk aggregate 24 of the radial-gap type superconducting synchronous machine 1. In this embodiment the electric current is continuously supplied to the coil 102 so that magnetization is effected by static magnetic field magnetization.

Figure 11:
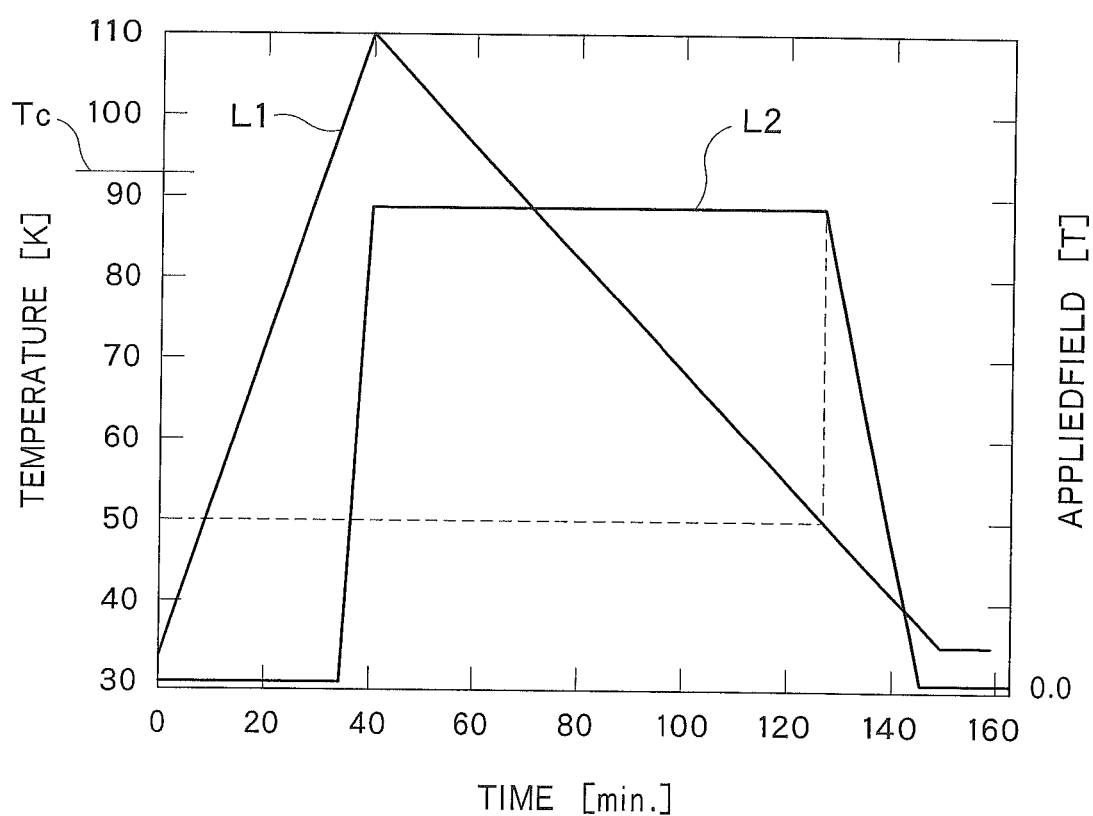
FIG. 11 is a diagram showing a graph illustrating an example of temperature control of a bulk superconductor and timing of the application of a magnetic field in the magnetization illustrated in FIG. 10.

FIG. 11 is a diagram showing a graph illustrating an example of temperature control of the bulk superconductors and timing of the application of a magnetic field in the magnetization according to this embodiment. In the graph of FIG. 11, the abscissa axis represents time, and the ordinate axis represents the temperature (K) of the bulk superconductors 30 and the magnetic flux density (T) of the magnetic field applied. The line L1 indicates the temperature of the bulk superconductors 30, and the line L2 indicates the magnetic flux density of the magnetic field generated by supplying an electric current to the coil 102. Tc represents the superconducting transition temperature.

As shown in FIG. 11, in this embodiment the application of static magnetic field (stationary magnetic field) to the bulk superconductors 30 is started under conditions that the temperature of the bulk superconductors 30 is controlled at a temperature higher than the superconducting transition temperature Tc. After the magnetic flux density of the static magnetic field has reached a predetermined target value, the temperature of the bulk superconductors 30 is lowered to a predetermined temperature (50 K in the illustrated example) lower than the superconducting transition temperature Tc while keeping the magnetic flux density at the target value. The bulk superconductors 30 are in a superconducting state from the superconducting transition temperature, which allows passage of magnetic flux lines through the bulk superconductors 30, when their temperature is lower than the superconducting transition temperature Tc. As shown by the graph of FIG. 11, the magnetic field is applied for a predetermined period of time (about 60 minutes in the illustrated example) until the temperature of the bulk superconductors 30 reaches the predetermined temperature lower than the superconducting transition temperature Tc. By thus continuing to apply the magnetic field to the bulk superconductors 30 until they are cooled to the sufficiently low temperature, a lot of magnetic flux lines are captured by the bulk superconductors 30.

Figure 12:
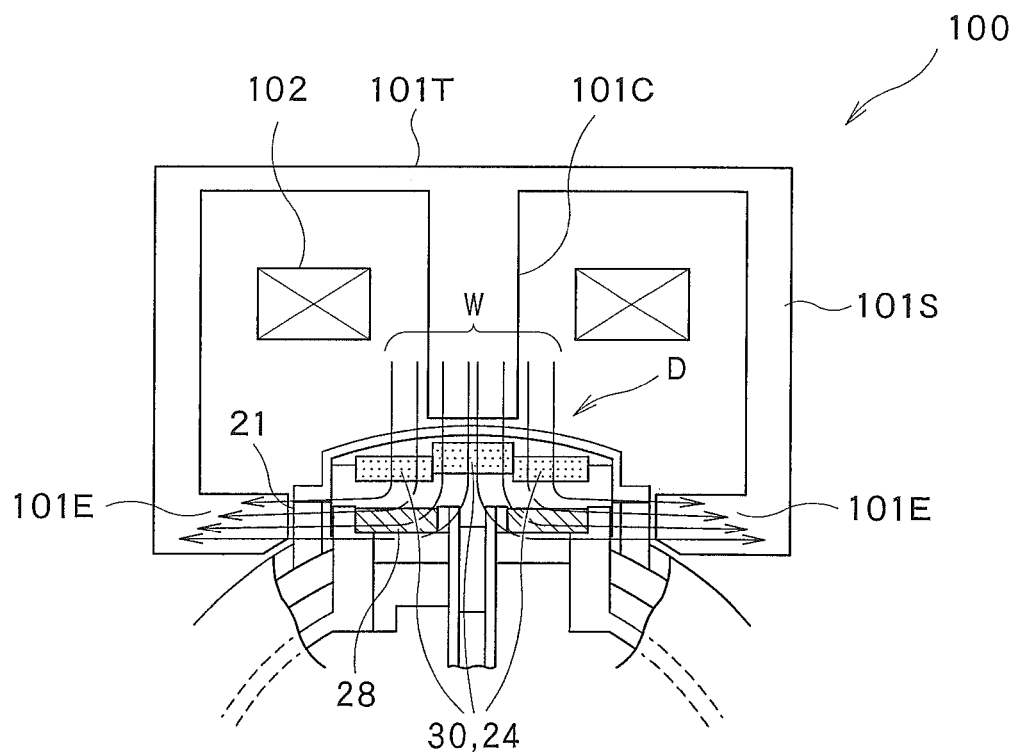
FIG. 12 is a diagram illustrating part of magnetic flux lines upon the magnetization illustrated in FIG. 10.

When the magnetic field is generated by the magnetizing apparatus 100 in the above-described manner, a magnetic circuit is formed in which, as shown in FIG. 12, magnetic flux flows in the following order: one end part (distal end part) of the core portion 101C→the bottom wall portion 101E→the peripheral wall portion 101S→the top wall portion 101T→the other end part (proximal end part) of the core portion 101C. Since the height of the peripheral wall portion 101S from the top wall portion 101T is larger than the height of the core portion 101C from the top wall portion 101T, magnetic flux lines W in the magnetic circuit, coming from the one end part (distal end part) of the core portion 101C and reaching the peripheral wall portion 101S (bottom wall portion 101E), are concentrated in the disposition space D lying inside the peripheral wall portion 101S and the bottom wall portion 101E, as shown in FIG. 12. This makes it possible to effectively ensure a high magnetic flux density on a line extending from the one end part of the core portion 101C in the disposition space D. Further, in this embodiment, because of the provision of the ferromagnet 28 in the radial-gap type superconducting synchronous machine 1, magnetic flux lines from the magnetizing apparatus 100 are guided so that they pass through the bulk aggregate 24 and reach the ferromagnet 28. In particular, in this embodiment, the ferromagnet 28 is located nearer to the core portion 101C than the outer surface of the bottom wall portion 101E. A generally-rectangular magnetic circuit, running through the housing of the magnetizing apparatus 100 and the ferromagnet 28, is therefore formed. Since the bulk aggregate 24 is located in the straight line portion of the magnetic circuit, magnetic flux lines effectively pass through the bulk aggregate 24. Magnetization of the bulk aggregate 24 can therefore be performed efficiently.

After applying the magnetic field for a predetermined period of time as described above, the supply of electric current to the coil 102 is stopped, i.e. the current applied to the coil 102 is made 0, whereby the magnetic field is eliminated as shown in FIG. 11. Thereafter, the rotor 20 is rotated, and the magnetic pole 21 of the rotor 20, to be next magnetized, is disposed in the disposition space D of the magnetizing apparatus 100 and subjected to magnetization.

According to the above-described embodiment, the coil 102 is covered by the top wall portion 101T and the peripheral wall portion 101S of the housing 101 made of ferromagnetic material, and the peripheral wall portion 101S opens in the opposite direction from the top wall portion 101T. A magnetic circuit is therefore formed in which magnetic flux flows in the following order: one end part (distal end part) of the core portion 101C→the bottom wall portion 101E→the peripheral wall portion 101S→the top wall portion 101T→the other end part (proximal end part) of the core portion 101C. Since the height of the peripheral wall portion 101S from the top wall portion 101T is larger than the height of the core portion 101C from the top wall portion 101T, magnetic flux lines W in the magnetic circuit, coming from the one end part (distal end part) of the core portion 101C and reaching the peripheral wall portion 101S (bottom wall portion 101E), are dense (concentrated) in the disposition space D lying inside the peripheral wall portion 101S and the bottom wall portion 101E. This makes it possible to effectively ensure a high magnetic flux density on a line extending from the one end part of the core portion 101C in the disposition space D. It therefore becomes possible to pass a high-density magnetic flux through an object to be magnetized on the line extending from the one end part of the core portion 101C in the disposition space D.

Further, in this embodiment, the peripheral wall portion 101S is provided with the bottom wall portion 101E made of a ferromagnetic material and extending from the distal end part of the peripheral wall portion 101S toward the core portion 101C. When viewed in the direction in which the core portion 101C vertically extends downward, the bottom wall portion 101E extends to a position not overlapping the core portion 101C, and the disposition space D is formed in an area located opposite the distal end part of the core portion 101C and inside the inner periphery of the bottom wall portion 101E. Since the magnetic flux lines W flow from the one end part (distal end part) of the core portion 101C and reach the bottom wall portion 101E, the magnetic flux lines can be made more dense (concentrated) on a line extending from the one end part of the core portion 101C in the disposition space D. This further increases the efficiency of magnetization of an object to be magnetized.

Further, because of the provision of the ferromagnet 28 in the radial-gap type superconducting synchronous machine 1, a lot of magnetic flux lines W from the magnetizing apparatus 100 are guided so that they pass through the bulk aggregate 24 and reach the ferromagnet 28. Thus, the dense or concentrated magnetic flux lines can be passed through the bulk aggregate 24 composed of the bulk superconductors 30.

As will be appreciated from the foregoing, the bulk aggregate 24 composed of the bulk superconductors 30 can be magnetized with high efficiency even though the coil 102 of the magnetizing apparatus 100 is disposed at a distance from the bulk aggregate 24, and the coil 102 is not a large-sized one surrounding the bulk aggregate 24. A sufficient captured magnetic flux can therefore be ensured in the bulk aggregate 24 even though magnetization is performed by the magnetizing apparatus 100 which is not large-sized. Thus, according to this embodiment, captured magnetic flux in the bulk aggregate 24 composed of the bulk superconductors 30 can be effectively increased while ensuring the practical utility. This makes it possible to increase the torque and the power output of the synchronous machine.

In the magnetizing apparatus 100 of this embodiment, sufficient captured magnetic flux can thus be ensured in the bulk aggregate 24 even though the coil 102 lies at a distance from the bulk aggregate 24. Therefore, the degree of freedom of disposition that can ensure sufficient captured magnetic flux for the bulk aggregate 24 can be enhanced. The practical utility can be ensured also in this respect. In particular, even though the magnetizing apparatus 100 is disposed in proximity to the bulk aggregate 24 of a magnetic pole 21, as an object to be magnetized, of the rotor 20 which is a multi-pole rotor in this embodiment, the magnetizing apparatus 100 can be prevented from interfering with the neighbor magnetic pole(s). Sufficient captured magnetic flux can therefore be ensured in each of the plurality of magnetic poles.

Further, in the radial-gap type superconducting synchronous machine 1 of this embodiment, when viewed in the direction of the rotational axis C1 of the rotor 20, the magnetic pole center side of the bulk aggregate 24 is disposed nearer to the stator 10 than the magnetic pole end side. Thus, the bulk aggregate 24 is disposed such that it follows the arc-shaped inner surface of the stator 10. This can reduce the gap between the bulk aggregate 24 and the stator 10, thereby making it possible to allow a magnetic field from the bulk aggregate 24 to efficiently act on the stator 10.

Further, in the radial-gap type superconducting synchronous machine 1 of this embodiment, after the bulk aggregate 24 is magnetized by the magnetizing apparatus 100, the magnetized bulk aggregate 24 is attracted by the magnetic force to the housing 101 of ferromagnetic material, constituting the magnetizing apparatus 100, while, at the same time, the bulk aggregate 24 is attracted to the ferromagnet 28 located on the rotational axis C1 side of the bulk aggregate 24. This can prevent the bulk aggregate 24 from moving toward the magnetizing apparatus 100, thus enabling the bulk aggregate 24 to be held in the initial installation position.

EXAMPLES

An example of the radial-gap type superconducting synchronous machine 1 will now be described. FIG. 13 is a diagram showing a table summarizing the performance of a radial-gap type superconducting synchronous machine of Example and the performances of conventional superconducting synchronous machines of Comp. Examples 1 to 3.

The table of FIG. 13 shows data on the "model" of each of the synchronous machines of Example and Comp. Examples 1 to 3, "rotational speed", "torque" and "power output" as exemplary performance parameters, "superconducting material" used for a field system or an armature, "refrigerant or cooling method" for maintaining the superconducting material at a low temperature, and "captured magnetic flux density" in a magnetic pole.

The radial-gap type superconducting synchronous machine 1 of Example was magnetized by the magnetizing apparatus 100 in the manner described above with reference to the above embodiment, whereby magnetic flux lines were captured by the bulk aggregate 24 of each magnetic pole 21. In Example, GdBCO was used for the bulk superconductors 30, and neon was used for the refrigerant. Further, for the radial-gap type superconducting synchronous machine 1 of Example, it was estimated that a very high captured magnetic flux density of, for example, 5.0 Tesla (T) is obtained, and a very high torque of 1508 Nm is obtained at a rotational speed of 190 rpm. The power output at that rotational speed was estimated to be 30 kW.

The synchronous machine of Comp. Example 1 is a reluctance-type superconducting synchronous machine (radial-gap type) that uses a YBCO ($YBa_2Cu_3O_{7-z}$) high-temperature superconducting bulk for a magnetic system pole, and liquid nitrogen as a refrigerant. As shown in the table, the comparative synchronous machine was found to have a torque of 127 Nm at a rotational speed of 3000 rpm, and a power output of 40 kW at that rotational speed. The comparative data demonstrates that compared to the synchronous machine of Comp. Example 1, the synchronous machine of Example can obtain a significantly higher torque at a lower rotational speed. This indicates that the synchronous machine of Example can promptly obtain a high output as compared to the synchronous machine of Comp. Example 1.

The synchronous machine of Comp. Example 2 is a radial-gap type superconducting synchronous machine that uses a YBCO high-temperature superconducting bulk for a magnetic system pole, and uses direct conduction cooling as a cooling method. As shown in the table, the comparative synchronous machine was found to have a torque of 24 Nm at a rotational speed of 600 rpm, and a power output of 1.5 kW at that rotational speed. The comparative data demonstrates that compared to the synchronous machine of Comp. Example 2, the synchronous machine of Example can obtain a significantly higher torque at a lower rotational speed. This indicates that the synchronous machine of Example can promptly obtain a significantly higher output as compared to the synchronous machine of Comp. Example 1.

The synchronous machine of Comp. Example 3 is an axial-gap type superconducting synchronous machine that uses a GdBCO superconducting material for a magnetic system, and liquid nitrogen as a refrigerant, and has a captured magnetic flux density of 0.8 to 0.9 T. As shown in the table, the comparative synchronous machine was found to have a torque of 212 Nm at a rotational speed of 720 rpm, and a power output of 16 kW at that rotational speed. The comparative data demonstrates that the synchronous machine of Comp. Example 3 can obtain a high torque at a relatively low rotational speed, but is inferior to the synchronous machine of Example. The comparative data indicates that the synchronous machine of Example can promptly obtain a significantly higher output as compared to the synchronous machine of Comp. Example 3. In Comp. Example 3, the bulk superconductor was magnetized by pulse magnetization.

While the present invention has been described with reference to preferred embodiments, it is understood that the present invention is not limited to the embodiments described above and that various changes and modifications may be made thereto. For example, though in the above-described embodiment the bulk aggregate 24 of the radial-gap type superconducting synchronous machine 1 is composed of the 15 bulk superconductors 30, the number of the bulk superconductors 30 is not limited to 15; for example, only one bulk superconductor may be provided in each magnetic pole 21. Further, the material of the bulk superconductors 30 is not limited to GdBCO.

Though in the above-described embodiment the radial-gap type superconducting synchronous machine 1 has the four magnetic poles 21, the number of the magnetic poles is not limited to four.

Though in the above-described embodiment the stator 10 of the radial-gap type superconducting synchronous machine 1 has a cylindrical shape having a circular cross-section and which is relatively long in the axial direction, the stator 10 may have an annular shape which is relatively short in the axial direction. When the rotor 20 has a relatively large size, the stator 10 preferably has an annular shape.

Materials other than the above-described materials can, of course, be used for the rotor 20 and the vacuum cover 3. Though the bulk superconductors 30 of the above-described embodiment have a rectangular shape as viewed from radially outside, it is possible to use other shapes such as a circular shape.

Instead of the bulk superconductors 30 used in the above-described embodiment, a superconducting wire rod may be used in the radial-gap type superconducting synchronous machine 1. Though the housing 101 of the magnetizing apparatus 100 may not necessarily have the bottom wall portion 101E, the provision of the bottom wall portion 101E can increase the efficiency of magnetization.

DESCRIPTION OF THE REFERENCE NUMERALS 1 radial-gap type superconducting synchronous machine
2 rotating shaft
3 vacuum cover
4 heat-transfer member
5 heat exchanger
10 stator
20 rotor
21 magnetic pole
22 rotor body
22A disk portion
22B drum portion
22C magnetic pole fixing portion
23 cooling base member
23A installation surface
23B connecting portion
23C central portion
23S side portion
24 bulk aggregate
25 bulk fixing member
28 ferromagnet
30 bulk superconductors
100 magnetizing apparatus
101 housing
101T top wall portion
101S peripheral wall portion
101C core portion
101E bottom wall portion
102 coil
103 connecting wire
104 current supply section

The invention claimed is:

1. A radial-gap type superconducting synchronous machine comprising:
a stator having a circular cross-sectional shape;
a rotor rotatably supported inside the stator; and
a superconductor disposed on the peripheral side of the rotor, wherein the rotor includes a rotor body secured to a rotating shaft, and a convex magnetic pole provided on the periphery of the rotor body, wherein the rotor body includes a magnetic pole fixing portion projecting outward in the radial direction, wherein the magnetic pole, includes the superconductor at a distal end of the magnetic pole which is radially outside the magnetic pole fixing portion, wherein the superconductor includes one or more bulk superconductors, wherein when viewed in the direction of a rotational axis of the rotor, the magnetic pole center side of the superconductor is disposed nearer to the stator than the magnetic pole end side of the superconductor, and wherein a ferromagnet is disposed on the rotational axis side of the superconductor.

2. The radial-gap type superconducting synchronous machine according to claim 1, wherein the superconductor is disposed in plural numbers at the distal end part of the magnetic pole, and the plurality of superconductors are disposed in such a stepped arrangement that when viewed in the direction of the rotational axis of the rotor, a superconductor closest to the center of the magnetic pole is located nearer to the stator than the other superconductors.

3. The radial-gap type superconducting synchronous machine according to claim 1, wherein the superconductor has a rectangular shape as viewed from outside in the radial direction of the rotor.

4. The radial-gap type superconducting synchronous machine according to claim 1, wherein the superconductor is disposed in plural numbers at the distal end part of the magnetic pole, and the plurality of superconductors are disposed at the distal end part of the magnetic pole such that they are arranged in the circumferential direction of the rotor, and that they are arranged in the direction of the rotational axis of the rotor.

\* \* \* \* \*